(12) United States Patent
Conte et al.

(10) Patent No.: US 9,328,857 B2
(45) Date of Patent: May 3, 2016

(54) SYSTEM AND METHOD FOR REAL-TIME TRACKING OF OBJECTS

(75) Inventors: Giacomo Conte, Galloway, OH (US); Larry J. Rapp, Powell, OH (US); Gary L. Rapp, Dublin, OH (US)

(73) Assignee: Zia Systems, LLC, Galloway, OH (US)

( * ) Notice: Subject to any disclaimer, the term of this patent is extended or adjusted under 35 U.S.C. 154(b) by 834 days.

(21) Appl. No.: 12/850,067

(22) Filed: Aug. 4, 2010

(65) Prior Publication Data

US 2011/0030875 A1 Feb. 10, 2011

Related U.S. Application Data

(60) Provisional application No. 61/231,082, filed on Aug. 4, 2009, provisional application No. 61/305,263, filed on Feb. 17, 2010.

(51) Int. Cl.
| | |
|---|---|
| *B29C 63/00* | (2006.01) |
| *F16L 55/165* | (2006.01) |
| *G01V 15/00* | (2006.01) |
| *B29C 35/04* | (2006.01) |
| *B29C 63/34* | (2006.01) |
| *B29C 35/08* | (2006.01) |
| *B62B 5/00* | (2006.01) |

(52) U.S. Cl.
CPC ......... *F16L 55/1652* (2013.01); *F16L 55/1651* (2013.01); *G01V 15/00* (2013.01); *B29C 35/041* (2013.01); *B29C 63/34* (2013.01); *B29C 2035/0827* (2013.01); *B62B 5/0096* (2013.01)

(58) Field of Classification Search
CPC ............. F16L 55/1652; F16L 55/1651; B29C 35/041; B29C 63/34; B29C 2035/0827; B62B 5/0096; G01V 15/00

USPC ................ 156/64; 340/572.1; 455/553, 556.1
See application file for complete search history.

(56) References Cited

U.S. PATENT DOCUMENTS

| | | |
|---|---|---|
| 6,053,211 A | 4/2000 | Schwert et al. |
| 6,512,478 B1 | 1/2003 | Chlen |
| 6,879,257 B2 | 4/2005 | Hisano et al. |
| 6,919,803 B2 | 7/2005 | Breed |
| 7,038,584 B2 | 5/2006 | Carter |
| 7,106,189 B2 | 9/2006 | Burneske et al. |

(Continued)

FOREIGN PATENT DOCUMENTS

| | | |
|---|---|---|
| EP | 0553558 | 8/1993 |
| EP | 2037246 | 3/2009 |
| WO | 2011017403 | 2/2011 |

OTHER PUBLICATIONS

International Search Report and Written Opinion in PCT/US2010044357 mailed Nov. 1, 2010 (9 pages).

*Primary Examiner* — George Koch
(74) *Attorney, Agent, or Firm* — Calfee, Halter & Griswold LLP

(57) ABSTRACT

Real-time location systems and methods use small, battery operated sensors and radios. The radios conform to the IEEE 802.15.4 standard. The radios are attached to objects to form mobile nodes. Fixed nodes are positioned to define a wired or wireless mesh network representing an area in which the objects can be monitored and tracked. The real-time location systems/methods provide robust, flexible and highly scalable systems/methods for remotely, accurately, efficiently, and/or readily tracking and securing objects (e.g., equipment, inventory, people) at a relatively low cost.

13 Claims, 7 Drawing Sheets

(56) References Cited

U.S. PATENT DOCUMENTS

| | | |
|---|---|---|
| 7,152,791 B2 | 12/2006 | Chappidi et al. |
| 7,170,413 B1 | 1/2007 | Waterhouse et al. |
| 7,180,421 B2 | 2/2007 | Pahlaven et al. |
| 7,212,122 B2 | 5/2007 | Gloekler et al. |
| 7,218,227 B2 | 5/2007 | Davis et al. |
| 7,236,091 B2 | 6/2007 | Kiang et al. |
| 7,242,294 B2 | 7/2007 | Warrior et al. |
| 7,277,014 B1 | 10/2007 | Waterhouse et al. |
| 8,162,535 B2 | 4/2012 | Glombitza |
| 2003/0160391 A1 | 8/2003 | McEwan |
| 2006/0067286 A1 | 3/2006 | Cornett |
| 2006/0074525 A1 | 4/2006 | Close et al. |
| 2006/0137816 A1 | 6/2006 | Taylor et al. |
| 2006/0202816 A1 | 9/2006 | Crump et al. |
| 2006/0220809 A1 | 10/2006 | Stigall et al. |
| 2006/0220842 A1 | 10/2006 | Breed |
| 2006/0267731 A1 | 11/2006 | Chen |
| 2006/0279427 A1 | 12/2006 | Becker et al. |
| 2006/0290491 A1 | 12/2006 | Wagner et al. |
| 2007/0013512 A1 | 1/2007 | Burneske et al. |
| 2007/0018811 A1 | 1/2007 | Gollu |
| 2007/0038346 A1 | 2/2007 | Ehrlich et al. |
| 2007/0085681 A1 | 4/2007 | Sawyer |
| 2007/0115116 A1 | 5/2007 | Zabek |
| 2007/0120736 A1 | 5/2007 | MacKenzie et al. |
| 2007/0139191 A1 | 6/2007 | Quatro |
| 2007/0168127 A1 | 7/2007 | Zaruba et al. |
| 2007/0182544 A1 | 8/2007 | Benson et al. |
| 2007/0188322 A1 | 8/2007 | English et al. |
| 2008/0173109 A1* | 7/2008 | Cogen et al. .......... 73/865.8 |
| 2009/0024161 A1 | 1/2009 | Bonutti et al. |
| 2009/0165927 A1 | 7/2009 | Driver et al. |
| 2011/0186203 A1 | 8/2011 | Lindner et al. |

* cited by examiner

SYSTEM AND METHOD FOR REAL-TIME TRACKING OF OBJECTS

RELATED APPLICATIONS

The present application is being filed as a U.S. non-provisional patent application claiming priority/benefit under 35 U.S.C. §119(e) from the U.S. provisional patent application having Ser. No. 61/231,082 and filed on Aug. 4, 2009 and the U.S. provisional patent application having Ser. No. 61/305,263 and filed on Feb. 17, 2010, the entire disclosures of which are incorporated herein by reference.

FIELD

The general inventive concepts relate to and contemplate systems and methods for the real-time tracking of objects and, more specifically, to systems and methods using a wireless network to define an environment in which tagged objects can be tracked.

BACKGROUND

It is known in the art to place tags on animate and/or inanimate objects to facilitate the detection and tracking of the objects. Such tracking of objects has many applications including inventory control and management, loss prevention and recovery, etc. Various technologies have been deployed to form environments in which the tagged objects can be tracked. For example, a network of satellites (e.g., the Global Positioning System (GPS)), a wireless network according to the IEEE 802.11 standard (e.g., WiFi), a wireless network according to the IEEE 802.15.1 standard (e.g., Bluetooth), etc. could be used to define the environment in which the tagged objects are tracked. Each of these technologies, however, suffers from drawbacks that can contribute to an inefficient, ineffective, undesirable and/or cost prohibitive object tracking system when so employed.

For example, a tracking system implemented using GPS suffers from line-of-site issues in that it cannot penetrate through objects (e.g., buildings) to track the tagged objects. As a result, GPS is ill-suited for many applications, such as those requiring tracking of objects below ground. Furthermore, the quality of a GPS-implemented system can be adversely affected by inclement weather (e.g., precipitation), atmospheric conditions (e.g., humidity), and multipath effects. As a result, GPS is ill-suited for many applications, such as those requiring tracking of objects outdoors. Further still, the location accuracy of a GPS-implemented system is generally in the range of 5 to 15 meters. As a result, GPS is ill-suited for many applications, such as those requiring more accurate tracking of objects. Cost is another drawback. Most GPS units today cost over $250, which includes the GPS function and means for remote communications (cell or satellite modem). As a result, GPS is ill-suited for many applications, such as those requiring numerous units. Size is another issue with GPS units, which are typically the size of a deck of cards or larger. As a result, GPS is ill-suited for many applications, such as those requiring relatively small tags. Furthermore, GPS units have a relatively high power consumption. For example, in a GPS unit, batteries can have a life cycle of 1 to 7 days, unless attached to a recharging battery or the like. As a result, GPS is ill-suited for many applications, such as those requiring tags having a low power consumption.

As another example, a tracking system implemented using WiFi suffers from drawbacks. For example, WiFi units were designed for wide bandwidth applications, such as computer-computer communications, video and audio over IP. As a result, WiFi is ill-suited for many applications, such as those requiring a more narrow, focused bandwidth. Furthermore, WiFi units (i.e., nodes) have a relatively high power consumption. For example, battery life is usually 0.5 to 5 days. As a result, WiFi is ill-suited for many applications, such as those requiring tags having a low power consumption. WiFi networks are wireless from the access nodes to the endnodes, but the access nodes (or routers) are typically wired together in order to enhance the range of the network, and at some point must be hardwired to the Internet backbone. As a result, WiFi is ill-suited for many applications, such as those in which hardwiring is impractical. WiFi networks are typically limited to a maximum of 32 endnodes in size. As a result, WiFi is ill-suited for many applications, such as those requiring increased scalability of the network size. Furthermore, in a WiFi network, the transmission range between endnodes and an access node is 1 to 100 meters. As a result, WiFi is ill-suited for many applications, such as those requiring an increased transmission range across the network.

As yet another example, a tracking system implemented using Bluetooth suffers from drawbacks. For example, Bluetooth is very limited in the number of endnodes that can be attached to a host. It is not uncommon for a Bluetooth network to be limited to 1 to 7 devices. As a result, Bluetooth is ill-suited for many applications, such as those requiring increased scalability of the network size. Furthermore, Bluetooth units (i.e., devices) have a relatively high power consumption. For example, battery life is usually in the range of 1 to 7 days. Consequently, Bluetooth devices normally require recharging at the same rate as a cell phone. As a result, Bluetooth is ill-suited for many applications, such as those requiring tags having a low power consumption. In a Bluetooth network, the transmission range between devices and a host is normally limited to a range of 1 to 10 feet. As a result, Bluetooth is ill-suited for many applications, such as those requiring an increased transmission range across the network. Furthermore, in a Bluetooth network, there is no redundancy or mesh network for alternate paths to the host. As a result, Bluetooth is ill-suited for many applications, such as those requiring failure protection.

Thus, there is an unmet need in the art for object tracking systems and methods that overcome these and/or other drawbacks and provide a more cost-effective, robust, accurate, scalable, and/or flexible approach for the tracking of objects in an environment.

SUMMARY

In view of the above, it is an exemplary aspect to provide systems and/or methods for tracking tagged objects in an environment, wherein the environment is a highly scalable mesh network based on the IEEE 802.15.4 standard (e.g., the ZigBee specification).

It is another exemplary aspect to provide systems and/or methods for tracking tagged objects in an environment, wherein each of the tagged objects includes a relatively small, low-power, and low-cost digital radio (i.e., tag). Preferably, but not necessarily, the digital radios have an average battery life of between 100 to 1000 days.

It is yet another exemplary aspect to provide systems and/or methods for tracking tagged objects in an environment, wherein the environment can extend indoors and/or outdoors.

It is still another exemplary aspect to provide systems and/or methods for tracking tagged objects in an environment, wherein the environment can extend above ground and/or below ground.

It is an exemplary aspect to provide systems and/or methods for remotely monitoring tagged objects in an environment.

It is another exemplary aspect to provide systems and/or methods for real-time tracking of tagged objects in an environment, wherein the systems/methods use software for maintaining, mapping, reporting, and logging of nodes in the network, such as their location, sensor readings and activity, alarms, alerts, warnings, and zone (e.g., "geozone") entrance or exit.

It is still another exemplary aspect to use imbedded code to enhance the location calculation by taking into consideration environment (temperature), RSSI (received signal strength indication) fluctuations and "known" vs. "calculated" locations of the reference nodes (differential values).

Numerous other aspects, advantages and/or features of the general inventive concepts will become more readily apparent from the following detailed description of exemplary embodiments, from the eventual claims, and from the accompanying drawings and related papers being submitted herewith.

BRIEF DESCRIPTION OF THE DRAWINGS

The general inventive concepts as well as embodiments and advantages thereof are described below in greater detail, by way of example, with reference to the drawings in which.

DETAILED DESCRIPTION

Figure 1:
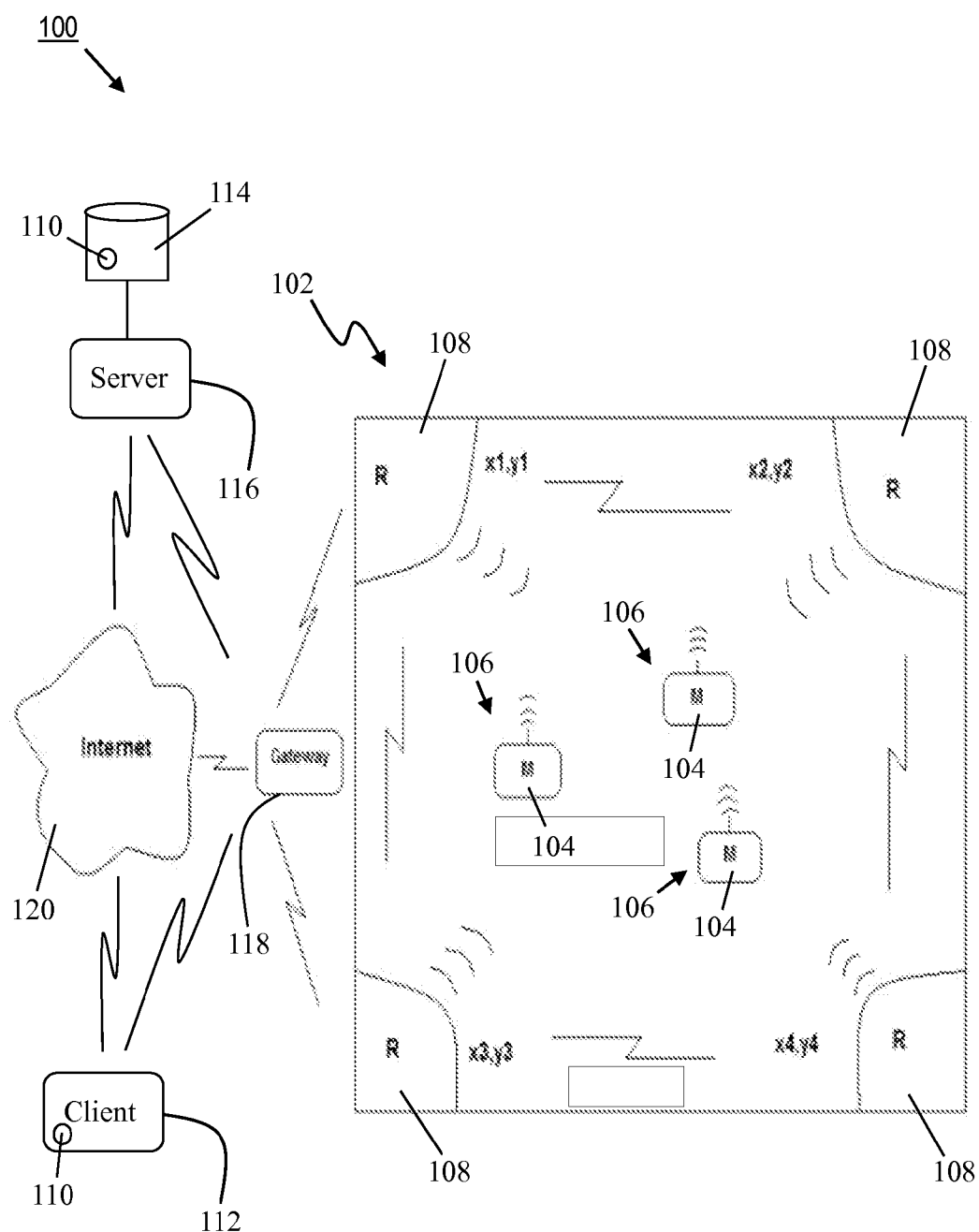
FIG. 1 is a diagram of a mesh network defining an environment in which tagged objects can be tracked, according to one exemplary embodiment.

While the general inventive concepts are susceptible of embodiment in many different forms, there are shown in the drawings and will be described herein in detail specific embodiments thereof with the understanding that the present disclosure is to be considered as an exemplification of the principles of the general inventive concepts. Accordingly, the general inventive concepts are not intended to be limited to the specific embodiments illustrated herein.

Referring to FIG. 1, a real-time location system 100 integrates a private wireless mesh network 102, including mobile nodes 104 formed by attaching tags 106 (e.g., mobile Active RFID tags) to objects (e.g., pipes, shopping carts, vehicles, livestock) and fixed reference nodes 108, with software 110 implementing a Web-based operating and reporting system for access at a client computer 112. The software 110 can be stored on the client computer 112 and/or on a file store or database 114 associated with a server computer 116. One of ordinary skill in the art will appreciate that the client computer 112 and the server computer 116 could be the same computer. Additionally, the mesh network 102 can be implemented as a wired or at least partially wired network.

An access point or gateway 118 connects the mesh network 102 to a communication network 120 so that the client computer 112 and the server computer 116 can communicate with the mesh network 102 over the communication network 120. Preferably, but not necessarily, the communication network 120 is the Internet. Preferably, but not necessarily, the client computer 112 and the server computer 116 can communicate with one another over the communication network 120. In one exemplary embodiment, the client computer 112 and/or the server computer 116 can communicate directly with the mesh network 102 (i.e., without sending data over the communication network 120) via the gateway 118. The exchange of data within the mesh network 102, as well as outside the mesh network 102, can be done securely as known in the art (e.g., via encryption).

The mesh network 102 represents the defined environment for tracking objects. The mesh network includes the mobile nodes 104 (and corresponding mobile tags 106, each having an IEEE 802.15.4 radio) as the objects to be monitored/tracked within the defined environment.

The mesh network 102 also includes the fixed reference nodes 108. The fixed reference nodes 108 are used to extend the reach of the mobile nodes 104, for example, up to one mile. By way of example, the mesh network 102 shown in FIG. 1 depicts a defined environment having an area of approximately 1 acre. The reference nodes 108 (indicated as "R" in FIG. 1) are fixed and have known x,y locations within the defined environment. The mobile nodes 104 (indicated as "M" in FIG. 1) use the reference nodes 108 to calculate their location within the defined environment at any given time.

The reference nodes 108 are considered to be "mesh" in that they can communicate with other reference nodes 108 within the mesh network 102 in order to pass packets of data to and from the gateway 118. Preferably, but not necessarily, the reference nodes 108 are placed at the outer periphery of the defined environment. For example, in the exemplary embodiment shown in FIG. 1, the reference nodes 108 are placed at the four corners of the square representing the 1-Acre lot so as to be substantially equidistant from one another. In one exemplary embodiment, the reference nodes 108 are powered by 110 V power outlets or solar cells. One of ordinary skill in the art will appreciate that other known means could be used to power the reference nodes 108.

A type of ad hoc network, the mesh network 102 routes data between nodes (e.g., the reference nodes 108), thereby allowing for continuous connections and reconfiguration around broken or blocked paths by "hopping" from node to node until the desired destination is reached. In this manner, if a reference node 108 is being used to route data from a mobile node 104 to the access point/gateway 118 and the reference node 108 or its radio becomes unavailable or otherwise decommissioned, the system 100 automatically determines an alternative path to route the data to its destination. Thus, all of the reference nodes 108 act as stepping stones to the gateway 118. This redundancy and self-healing capability of the mesh network 102 helps the system 100 maintain 100% uptime.

Using the mesh network 102, the real-time location system 100 achieves a location accuracy of between 1 to 3 meters compared, for example, to 7 to 10 meters for a GPS-based system. Furthermore, the mesh network 102 is more reliable than a WiFi-based network. Further still, the mesh network 102 does not interfere with existing WiFi networks.

A Zigbee-compliant firmware stack (hereinafter, the stack) resides on each of the nodes 104, 108. The stack on the reference nodes 108 allows for the mesh networking capabilities, however the stack on the mobile nodes 104 does not. The mobile nodes 104 do not communicate with each other, but do communicate with the reference nodes 108, in a star-like manner. The stack includes the software that gives the nodes 104, 108 additional intelligence/capabilities. For example, the stack includes various algorithms that interpret the location information from the location engine of the nodes 104, 108, as described below. In one exemplary embodiment, these algorithms improve the accuracy of the location determination/calculation by taking into consideration factors such as environmental conditions (e.g., temperature), received signal strength indicator (RSSI) fluctuations, and/or "known" vs. "calculated" locations of the reference nodes 108 (i.e., differential values). The aforementioned location engine defines the software and/or hardware that facilitates determination of a current location of a mobile node 104.

The real-time location system 100 shown in FIG. 1 is an exemplary installation model suitable for deployment at an above-ground, outdoor facility. A similar installation model could be used for below-ground and/or indoor deployment of the real-time location system 100. Multiple instances of such installation models could be linked together to expand the mesh network 102 to cover an almost unlimited area.

In the real-time location system 100, the gateway 118 collects data from the nodes (e.g., the mobile nodes 104) and sends the data to the software 110 (e.g., over the communication network 120) using any appropriate communications mechanism, such as Ethernet, General Packet Radio Service (GPRS), Cellular or Satellite communications.

In one exemplary embodiment, there is one gateway 118 per defined environment (e.g., the mesh network 102). The gateway is considered the network coordinator. It communicates to the nodes in the network and also is linked, typically, via RS232 to a computer that is running network control software. The gateway 118 also provides information to a local mapping and reporting application (i.e., the software 110). The gateway 118 can also be linked to the Internet via Ethernet, GSM/GPRS modem or WiFi, in order to allow "controlled" remote access to the application (i.e., the software 110) from anywhere in the world. In one exemplary embodiment, controlled remote access is implemented as User ID and Password access control for those persons permitted to access the application.

Figure 2:
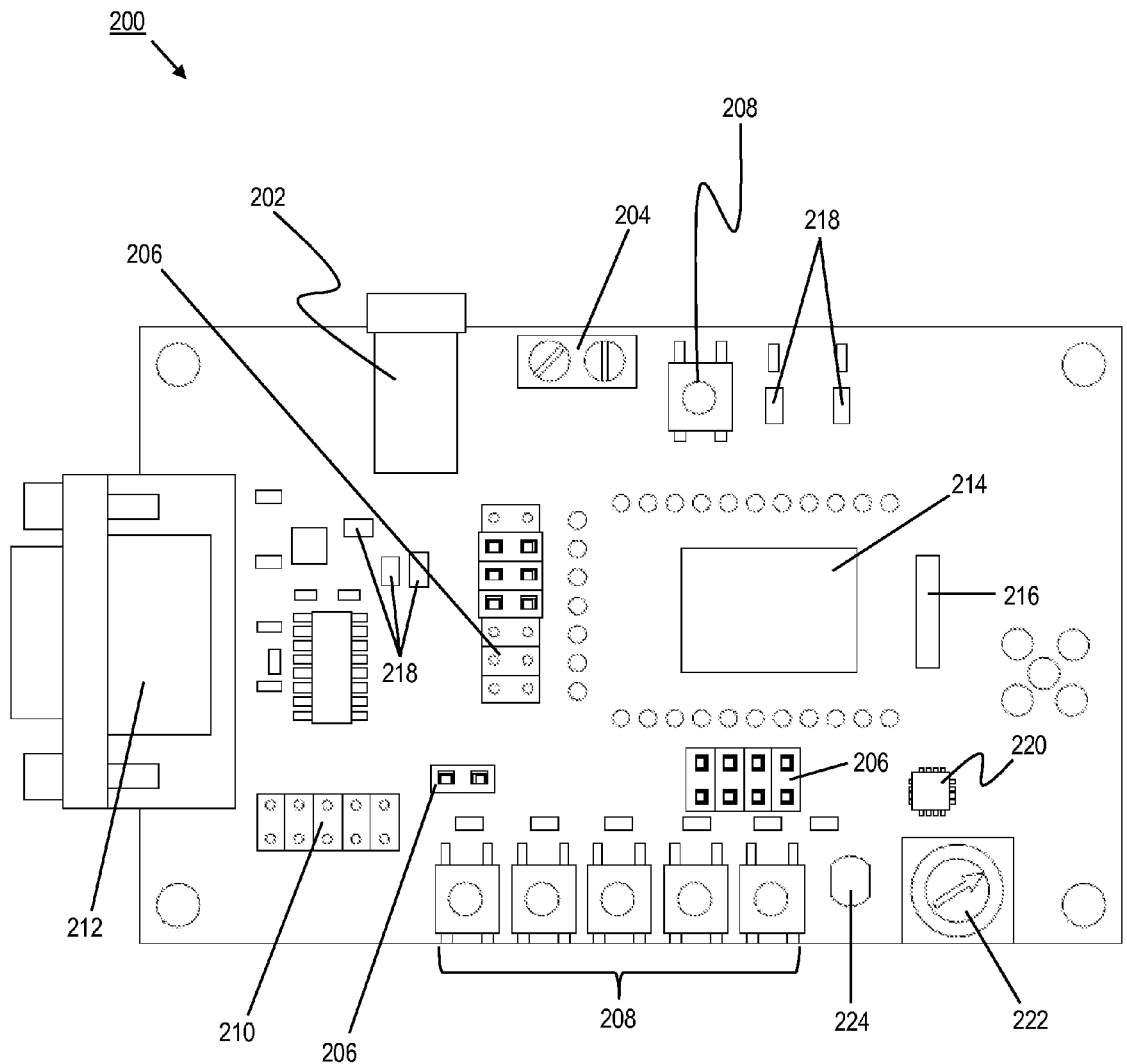
FIG. 2 is an image of an IEEE 802.15.4-compliant module, according to one exemplary embodiment, for use in the nodes of the wireless mesh network of FIG. 1.

An IEEE 802.15.4-compliant module 200, according to one exemplary embodiment, is shown in FIG. 2. To simplify this illustration, some components (e.g., circuit connections) are omitted. This exemplary module 200 includes, for example, a DC jack 202 for applying a supply voltage to the module 200. Additionally, the module 200 includes a supply voltage terminal block 204 where a battery pack or some other power supply can be connected to the module 200.

The module 200 includes various jumpers 206 (e.g., VCC, I/O) which allow a user to configure operation of the module 200. The module 200 also includes six push buttons 208 which allow a user to configure and/or interact with the module 200. The module 200 further includes an interface 210 which allows a user to program firmware into the module 200 and debug the code. The module 200 also includes an RS-232 connector 212 as a serial port that can be used to connect the module 200 to other equipment, such as an external computer.

The module 200 includes an 802.15.4 compliant radio 214 (e.g., an RC2300AT radio from Radiocrafts) which includes a microcontroller unit (MCU) and an integrated an antenna 216. The module 200 also includes LEDs 218 which are used as status indicators (e.g., power supplied, UART activity).

The module 200 further includes an accelerometer 220, a potentiometer 222, and a light sensor 224. The accelerometer 220 can be used to measure movements in two axes. The accelerometer 220 can also be used to measure tilt using the Earth's gravitation. The potentiometer 222 is connected as a voltage divider between the supply voltage and ground, wherein turning a knob of the potentiometer 222 clockwise gives maximum voltage. The light sensor 224 is a light dependent resistor that measures the light level (output as an analog signal) across a resistance range of 5K (light) to 20M (dark).

The module 200 can be used in the nodes 104, 108 of the mesh network 102 of FIG. 1. In one exemplary embodiment, each of the mobile nodes 104 and the reference nodes 108 will use the same basic components. In one exemplary embodiment, the mobile nodes 104 and the reference nodes 108 are relatively small in size (e.g., measuring a few inches by a few inches). In one exemplary embodiment, the mobile nodes 104 and/or the reference nodes 108 measures approximately 1 inch by 1 inch.

In one exemplary embodiment, each of the mobile nodes 104 and the reference nodes 108 includes an 802.15.4 compliant radio (e.g., the RC2300AT radio from Radiocrafts), an antenna, a microcontroller unit (MCU) with built-in location engine, an accelerometer, a temperature sensor, a low battery indicator sensor, and a power unit (e.g., Battery, Solar, 110V), plus other commercial off-the-shelf components to make up an integrated module or daughter board, such as the module 200. A commissioning process identifies which nodes are mobile endpoints and which nodes are fixed reference points, thereby differentiating the mobile nodes 104 from the reference nodes 108.

In one exemplary embodiment, the radio has an approximate range of 100 to 300 meters outdoors and 30 to 64 meters indoors, with the actual range (and accuracy) depending on various factors such as the antenna type and environmental conditions.

In one exemplary embodiment, the antenna of the module 200 is an omni-directional antenna that allows for the multi-directional transmitting and receiving of radio signals. The omni-directional antenna is useful in tracking the mobile nodes 104 since the bearing of the mobile nodes 104 relative to the reference nodes 108 or other hardware (e.g., routers) is unknown and/or constantly changing. Accordingly, the omni-directional antenna facilitates tracking of the mobile nodes 104.

In one exemplary embodiment, the reach of the antennas can be extended using additional hardware, such as a high gain directional antenna. For example, if a building has a real-time location system 100 including a mesh network of reference nodes (as a defined environment), a high gain directional antenna can be used to transmit information from the mesh network to another location, such as another building, far away (e.g., at a distance of 1 to 3 miles). Repeaters and routers could also be used to extend the reach of the antennas. In view of the above, the range of the radios in the system 100 can allow for data transmission over distances spanning several miles.

Each of the mobile tags 106 carries pertinent data about the object to which it is attached, such as identification data (e.g., a VIN number of a car), contents data (e.g., a list of items in a storage container), the tags current location, etc. Due to the reduced power requirements of the IEEE 802.15.4 radio, the mobile tags 106 have a significantly longer battery life (e.g., 100 to 1000 or more days) compared to the battery life (e.g., 5 to 7 days) of battery-powered tags used in other wireless systems. In one exemplary embodiment, the mobile tags 106 are battery operated with an average life cycle of 2 to 3 years. In one exemplary embodiment, the reference nodes 108 are battery powered with an average life cycle of 2 to 3 years. Thus, because the batteries in the IEEE 802.15.4 radios need to be replaced less often, parts and labor costs associated with replacing the batteries are substantially reduced over other wireless systems. In one exemplary embodiment, the reference nodes 108 are connected to a power source (e.g., a 110V power source). One of ordinary skill in the art will appreciate that the mobile tags 106 and the reference nodes 108 could be powered in other known ways, such as by solar power.

The software 110 running on the client computer 112 includes a graphical user interface (GUI) that is customizable and displays various pertinent information on the objects being tracked (e.g., status information, location information, sensor values). The software 110 can also send alarms, for example, via e-mail, text message or phone call. Additionally, a historical playback feature included in the software 110 allows a user to review logged activities after they occur. Also, a database of information (e.g., the database 114) associates the mobile tags 104 to their corresponding objects. The software 110 allows a user to generate various reports that show inventory and/or activity information for the tracked objects.

The real-time location system 100, including the software 110, provides precise, real-time, accurate tracking of objects, both indoors and outdoors, using the mesh network 102 of the mobile nodes 104 and the reference nodes 108, at a cost substantially less than current tracking systems available today, such as GPS-based tracking systems.

By way of example, exemplary applications of the real-time location system 100 include monitoring/tracking nuclear waste, military assets (e.g., vehicles, soldiers, munitions), construction assets (e.g., tools, heavy equipment), automotive assets (e.g., used cars, new cars), and livestock assets (e.g., cows), as well as monitoring the temperature, humidity and level of grain in silos, the location of shopping carts in and around stores such as department and grocery stores, and monitoring the pressure and temperature related to the curing process of cured-in-place pipeline (CIPP) rehabilitation. Accordingly, exemplary defined environments might include storage areas, military bases, construction sites, car dealerships/lots, cattle ranches, farms, and department/grocery stores. The real-time location system 100 allows a user to monitor/track the assets, as tagged objects, to ascertain the current location (in real-time) with an accuracy of 1 to 3 meters, as well as determining various attributes associated with the asset and/or the defined environment. In one exemplary embodiment, the real-time location system 100 supports up to eight different sensor readings for an asset (e.g., motion, temperature, pressure, granular/fluid levels).

Figure 3:
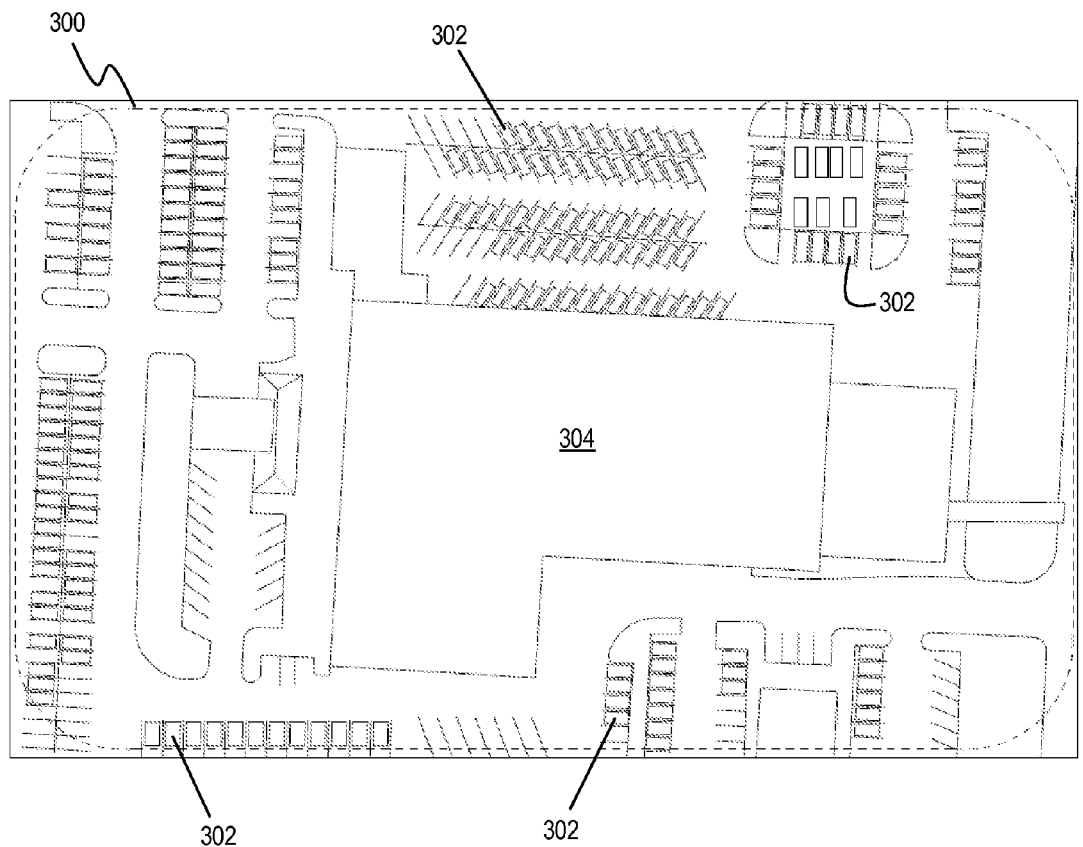
FIG. 3 is an image illustrating a lot of a car dealership, according to one exemplary embodiment.

As one example, the real-time location system 100 is implemented by an automotive dealer with an average of 250 to 300 vehicles on a 4-acre lot. Fixed reference nodes 108 are positioned to form a mesh network 102 at least large enough to encompass the entire lot, or a portion of the lot to be managed, as illustrated by dashed line 300 in FIG. 3. The mesh network 102 can be wired and/or wireless. Each vehicle 302 on the lot (or at least each vehicle 302 of interest) has a mobile tag 106 attached thereto. Additionally, vehicles 302 within a building 304, such as a service bay or showroom, can also have mobile tags 106 attached thereto.

An alert can be sent if any of the vehicles 302 move, move a predetermined distance, and/or move outside of a defined zone (e.g., off the lot). The alerts can be sent in any known manner, for example, via e-mail, text message, phone call, etc. The real-time location system 100 allows the location of any of the tagged vehicles 302 to be known at any time within 2 to 3 meters. A kiosk may be installed at the dealership to allow employees and/or customers to lookup the location of any tagged vehicle. In one exemplary embodiment, the kiosk runs a version of the software 110. Additionally, the real-time location system 100 can be used to alert the service and/or sales department when a tagged vehicle 302 returns to the lot. In view of the above, the real-time location system 100 allows the dealer to improve asset security, customer service, and inventory management.

Furthermore, the real-time location system 100 is flexible and can be readily adapted to track various properties of the inventory. For example, the real-time location system 100 could be used to determine or deduce which vehicle makes and models are most frequently subject to test drives, as well as the durations of those test drives. This might be a useful indication of customer preferences, particularly when correlated with actual sales data.

As another example, the real-time location system 100 is implemented by a large cattle rancher with 1,000 head of cattle on a 1-square-mile quadrant of a cattle ranch. The ranch has a total size of 19 square miles holding 10,000 head of cattle. Fixed reference nodes 108 are positioned to form a mesh network 102 at least large enough to encompass the entire ranch (e.g., 19 square miles), or a portion of the ranch to be managed (e.g., 1 square mile). The mesh network 102 can be wired and/or wireless.

With each of the 1,000 head of cattle having a mobile tag 106 attached thereto, an alert can be sent if any of the cows move outside the defined 1-square-mile quadrant or otherwise leaves the ranch. The alerts can be sent in any known manner, for example, via e-mail, text message, phone call, etc. The real-time location system 100 allows the location of any of the tagged cows to be known at any time within 2 to 3 meters. The real-time location system 100 could also aid in identifying if any of the tagged cows are exhibiting mad cow symptoms or not eating properly. Accelerometers imbedded in the tag would monitor for head movement or swaying that could indicate mad cow disease. Sensors attached to feeding bins could identify cattle that are feeding and the amount of food each has consumed. In view of the above, the real-time location system 100 allows the rancher to improve cattle roundup, inventory management, and security.

As yet another example, the real-time location system 100 is implemented by a farmer to remotely monitor grain levels in a silo. In particular, mobile tags 106 are placed inside the silo and/or allowed to rest on top of the grain. The mobile tags 106 allow for the remote monitoring of environmental conditions (e.g., temperature, humidity) within the silo, as well as a current level of the grain stored therein. The sensor readings can be logged for later review, generation of reports, etc.

If the silo or some other storage tank holds a liquid, the mobile tags 106 can be made buoyant so as to float on a surface of the liquid. Thus, by tracking a position of the mobile tags 106 relative to the fixed dimensions of the container, a level of the stored liquid can be measured from outside tank.

As a more detailed example, the real-time location system 100 is implemented by a grocery store to monitor and track shopping carts scattered around the store and its nearby parking areas.

Most retail stores (e.g., grocery, furniture, household items, specialty) provide shopping carts for use by their customers. Typically, these carts are stacked in a corral area within the store. A customer entering the store selects a cart from the corral area. The customer then uses the cart to transport items within the store prior to purchasing the items and out to their automobile thereafter. As a result, the customer often leaves the empty shopping cart in the store's parking lot or a designated area (e.g., corral area) in the parking lot.

Additionally, many customers either walk or take public transportation to these retail stores. An ongoing problem for these stores is the removal of their carts from the premises (i.e., beyond the parking lot). If the customer lives within walking distance of the store, the customer might use the cart to transport their purchased items to their home, thereafter failing to return the cart to the store. If the customer used public transportation to reach the store, the customer might use the cart to transport their purchased items to the public transportation pickup stop (e.g., bus stop, train stop), thereafter failing to return the cart to the store. There is also a growing problem with shopping cart theft. Replacing lost or stolen carts can be an expensive proposition. A new shopping cart can cost approximately $100 to $200 and a refurbished cart can cost approximately $55.

There are several current industry approaches to fighting this problem. For example, a store might hire a retrieval company, whose business is to locate lost and stolen shopping carts throughout a region (e.g., a city) and return the carts to the appropriate store for a fee. The retrieval fee could be $5 to $15 per cart.

As another example, a store might install a perimeter wire in the blacktop of the store's parking lot. This perimeter wire is similar to the so called "invisible fences" used to keep pets in their yards. In this case a special locking wheel is mounted on each cart. The locking wheel is actuated by a radio signal triggered by the cart going over the perimeter wire. Once actuated, the locking well is prevented from rotating thus rendering the cart ineffective as a means of transporting items. These locking wheels can cost approximately $30 each.

As yet another example, the store might hire a loss prevention (i.e., cart retrieval) employee to monitor the parking lot and "chase down" any individuals leaving the premises with a cart.

As still another approach, the store might install a GPS receiver on each cart and track its whereabouts using the GPS receiver.

Each of these current industry approaches has drawbacks.

For example, with respect to retrieval companies, a cottage industry of non-reputable firms has sprung up that not only return the carts for a fee, but also take the carts in the first place.

The perimeter wire approach can be expensive to implement. The perimeter wire might cost approximately $30,000 per store to install. Additionally, as noted above, each locking wheel can cost approximately $30, with each cart needing at least one locking wheel to be protected.

With respect to hiring a loss prevention employee, it may be difficult for the employee to constantly maintain focus on the parking lot to vigilantly watch for suspicious activity, due to fatigue and/or boredom.

The GPS approach can be expensive to implement. The GPS receiver units can cost approximately $250, plus a monthly cellular charge to communicate with each unit. Additionally, the GPS receiver may be affected by inclement weather. Further still, the GPS receiver will not work indoors where additional tracking functionality could benefit the store.

In view of these exemplary drawbacks to the current industry approaches, the real-time location system 100 is implemented by a grocery store to monitor and track shopping carts and, thus, customer, both inside and outside the store.

Figure 4:
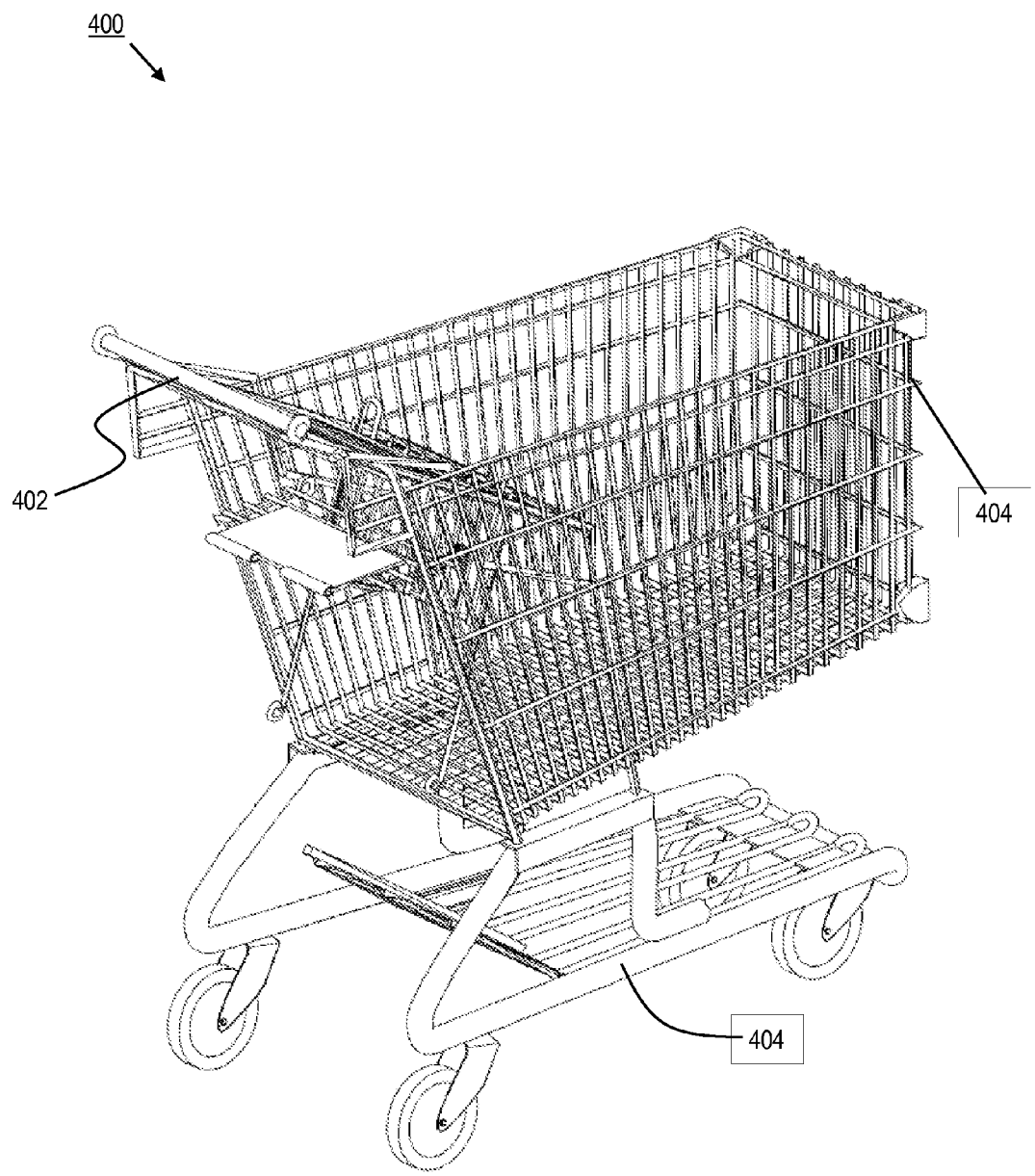
FIG. 4 is an image illustrating a shopping cart fitted with one or more mobile tags, according to one exemplary embodiment.

By way of example, a shopping cart 400, shown in FIG. 4, could have a mobile tag 106 inserted in its handle 402, affixed to its frame 404, and/or otherwise attached thereto so that the shopping cart 400 becomes a trackable mobile node 104. Similarly, a hand-carried shopping basket (not shown) or other grocery carrying means could be fitted with a mobile tag 106 so as to become a trackable mobile node 104. Given the small size and long battery life of the mobile tag 106, it could be formed integrally with the shopping cart 400 or basket.

A software "geozone" is defined around the perimeter of the store by placement of fixed reference nodes 108. Each geozone is an area identified by x,y coordinates of the fixed reference nodes 108, such as the four corners of a square area. Geozones can be positioned in multiple locations around and within the store area. If the shopping cart 400 or basket enters and/or leaves one of the geozones (e.g., the store's premises), an alert or notification can be sent to appropriate personnel. The notification can be sent, for example, via an instant message, a text message or an email. Alternatively, an alarm can be made to sound instead of or in addition to sending the notification. Appropriate actions can be triggered by receipt of these notifications. Accordingly, thefts of shopping carts and baskets can be prevented or otherwise reduced.

Figure 5:
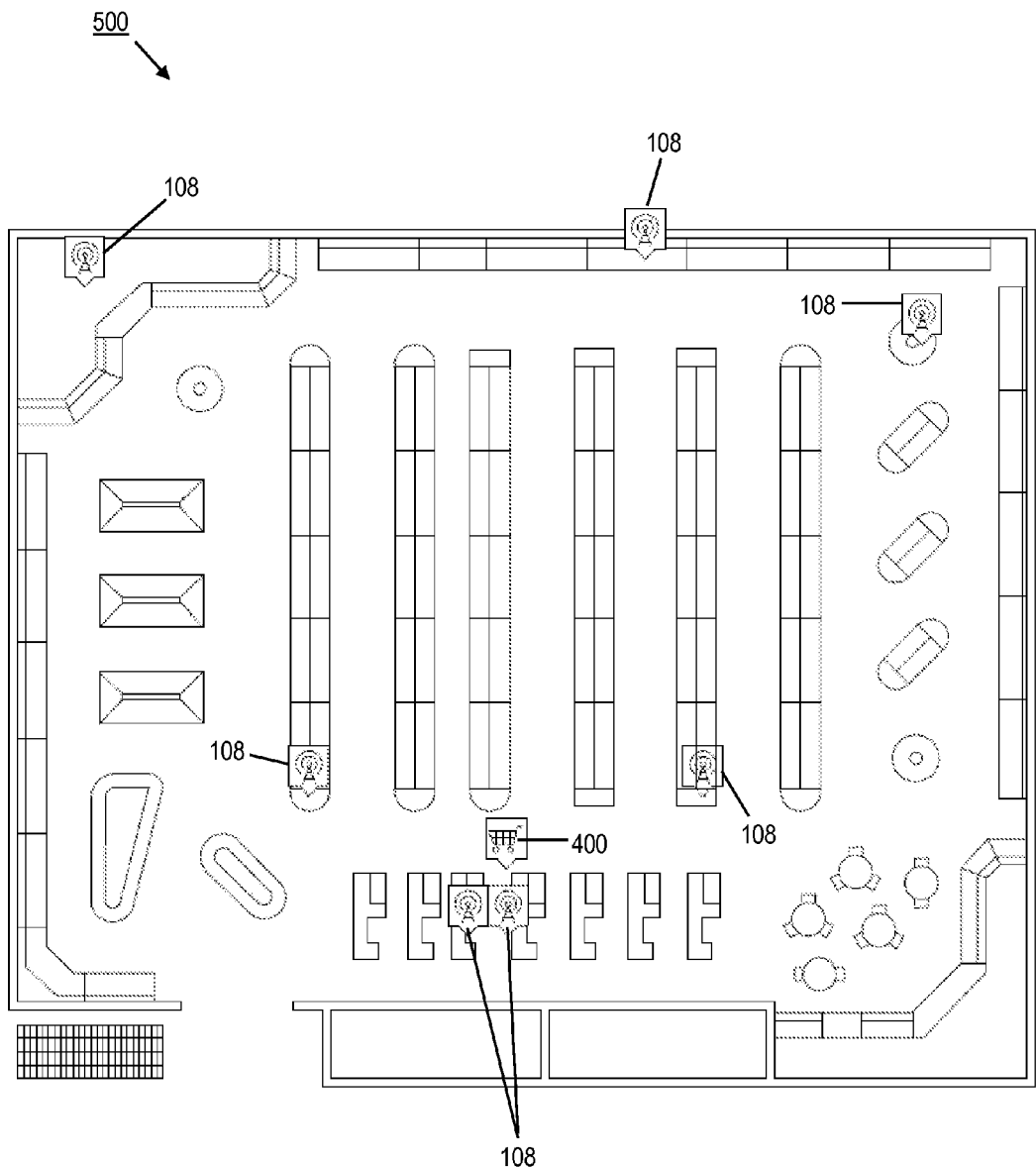
FIG. 5 is a diagram of a software geozone defined inside a store, according to one exemplary embodiment.

The tracking of shopping carts and baskets for security purposes is only one use for the real-time location system 100. Tracking the shopping carts and baskets indoors can provide valuable information to the store owners. For example, as shown in FIG. 5, the real-time location system 100 can be deployed to form a geozone 500 within a store by placement of fixed reference nodes 108. In this manner, the real-time location system 100 can be used to identify or determine: (1) a number of carts and baskets currently in use and the traffic patterns of those carts and baskets; (2) whether there are enough shopping carts and baskets inside the store to handle the number of customers wishing to use them; (3) locations within the store that customers tend to congregate or get delayed because of poor service; (4) whether a shopper went through a "checkout" area to pay for the merchandise before leaving the store; and (5) which shopping areas or isles receive the most traffic.

As another more detailed example, the real-time location system 100 is implemented by construction crews rehabilitating underground sewer lines. Throughout the U.S., thousands of miles of sanitary and storm sewer lines are in need of rehabilitation. One technique for performing such rehabilitation is the use of cured-in-place pipeliners (CIPP), which can be applied in pipes such as those forming water, sewer, gas, and chemical pipelines. Application of CIPP is considered a trenchless process, as little or no digging is required.

Figure 6:
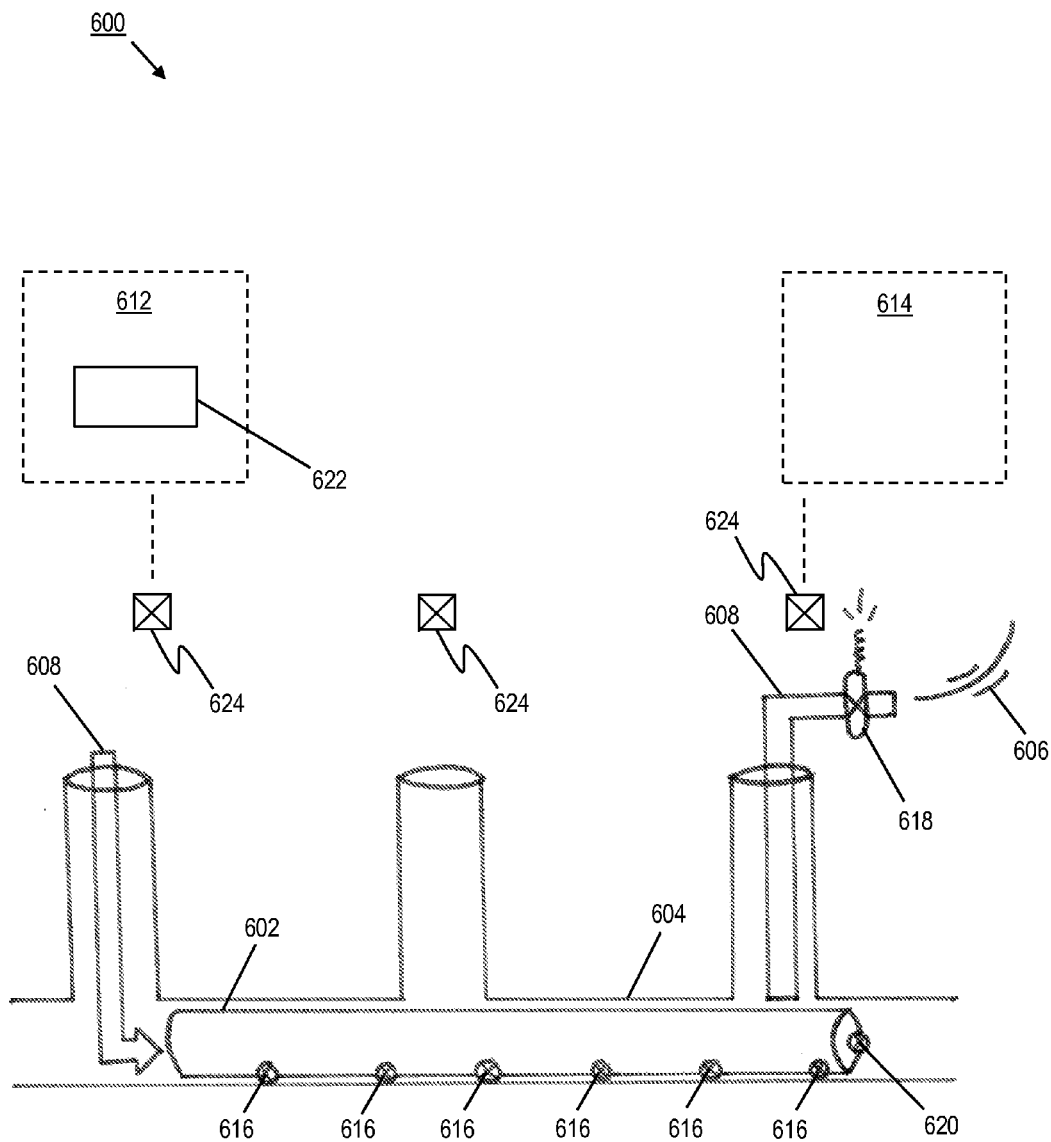
FIG. 6 is a sketch illustrating a cured-in-place pipeline (CIPP) rehabilitation process, according to one exemplary embodiment.

In a process 600 using CIPP, according to one exemplary embodiment described with reference to FIG. 6, a resin-saturated felt tube or liner 602 made of polyester is inverted, pulled, or otherwise maneuvered into a damaged pipe 604. The liner 602 could be made of other materials, for example, PVC or fiberglass. The liner 602 can be a reinforced or non-reinforced liner. Additionally, any suitable resin could be used. Exemplary types of thermoset resins include polyester, vinyl ester, and epoxy.

Next, hot water or steam 606 is passed through the pipe 604 to cure the resin and expand the liner 602, thereby forming a tight-fitting, jointless and corrosion-resistant replacement pipe. For example, a hose 608 or other delivery means is used to apply the hot water or steam 606 to the liner 602. Other means of curing the resin include, for example, application of heat or UV light. Additionally, a catalyst can be used to speed up the curing process.

Figure 7:
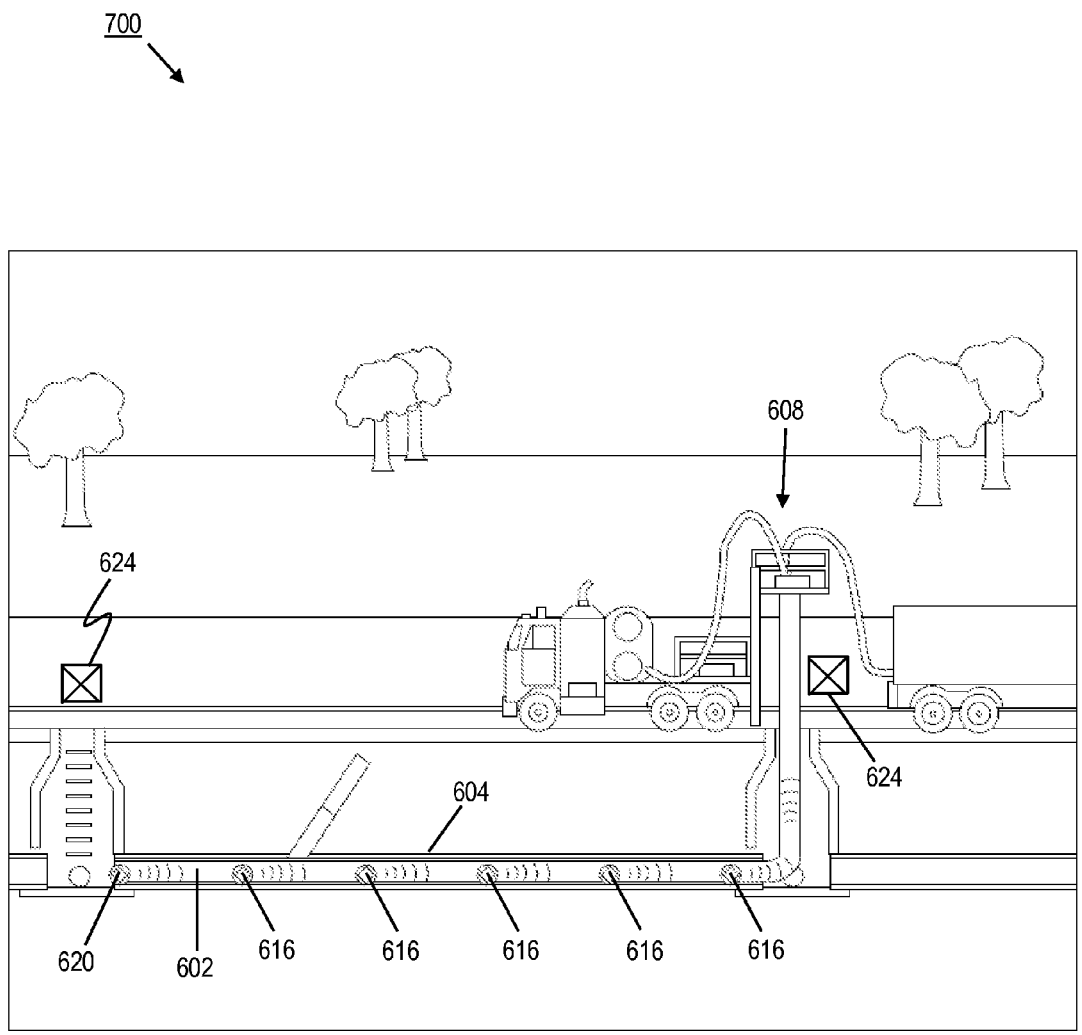
FIG. 7 is a drawing illustrating an exemplary variation of the cured-in-place pipeline (CIPP) rehabilitation process of FIG. 6.

After curing is complete, the ends of the liner 602 can be trimmed as needed. Additionally, precision cuts are made in the cured liner where other pipes feed into the pipe 604. For example, service laterals can be restored internally with robotically controlled cutting devices (not shown). The rehabilitated pipe is then inspected by closed-circuit television. An exemplary variation of the process 600 using CIPP is shown in FIG. 7.

Conventionally, the processing of cured-in-place pipeliners is a manual process. Water and steam are pumped through a sewer line from a first manned station to a second manned station, wherein the stations are typically far apart (e.g., 300 feet or further) from one another. An individual situated at the second station monitors and regulates the pressure through the line. Water temperature is controlled at the first station and fluctuates between cold water and steam/hot water. The individual at the second station visually monitors temperature and pressure gauges and manually adjusts the pressure as needed. The individual at the second station reports the readings by phone to the person at the first station. The readings are manually recorded in a log every three (3) minutes.

According to one exemplary embodiment, the real-time location system 100 provides a more efficient, cost-effective, and/or accurate CIPP process. For example, the system 100 can: (1) track a liner (e.g., liner 602) as it is introduced into a host pipeline (e.g., pipe 604); (2) monitor temperature and pressure of water and steam (e.g., water and/or steam 606) at a first station 612 and a second station 614 (i.e., upstream and downstream); (3) obtain localized readings of temperature and pressure of water and steam (e.g., water and/or steam 606) at predetermined points (e.g., every 10-20 feet) along a length of the liner; (4) actuate a valve, such as a ball valve (e.g., pressure valve) at the second station 614 to regulate the flow of the water and steam 606; (5) monitor a liner fold and send an alert as the fold approaches a manhole; and (6) record temperature and pressure readings periodically (e.g., every 3 minutes).

The system 100 and, in particular, the mobile tags 106/module 200 allow for placement of electronic pressure and temperature sensors 616 and radio actuated valves 618 at the second station 614. Accordingly, the monitoring and controlling can be done at the first station 612, thereby eliminating the need for an individual at the second station 614. Additionally, the actual location of the liner 602 during the inversion process can be monitored remotely at the first station 612.

In one exemplary embodiment, the mobile tags 106 are attached to a pressure valve actuator 618 and an end-point 620 (e.g., nose) of the liner 602. Additionally, other mobile tags 106 disposed along a length of the liner 602 function as the temperature and pressure gauges 616. In one exemplary embodiment, the mobile tags 106 are placed substantially equidistantly along the length of the liner 602, such as every 10 to 20 feet along the liner 602. The pressure and temperature sensors 616 provide feedback on the conditions during the curing process, which allows for a more controlled curing process and better overall cure of the liner 602.

As noted above, the mobile tags 106 are portable, highly intelligent communication and sensor devices capable of communicating wired or wirelessly via reference nodes 108 (e.g., fixed-point routers) back to a monitoring device 622 (e.g., a laptop, smart phone) at the first station 612. The mobile tags 106 facilitate the recording, tracking, and/or reporting of information such as the location of the liner nose 620 at any point in time, the accurate pressure gauge readings at a specified time interval, the accurate temperature gauge readings at a specified time interval, alerts on user-defined events (e.g., exceeding a pressure or temperature threshold, the liner fold approaching a manhole opening). Additionally, the mobile tags 106 can be used to remotely control actuation of the pressure valve 618.

In one exemplary embodiment, routers 624 (as reference nodes 108) are placed above ground from the second section station 614 to the first station 612. Here, the first station 612 is at or proximate to a first manhole (i.e., access shaft), while the second station 614 is at or proximate to a second manhole. Any number of additional manholes could be situated between the first station 612 and the second station 614. Adjacent manholes are typically separated by distances between 300 to 600 feet. In one exemplary embodiment, a fixed reference node 108 (e.g., router 624) is placed at each manhole connected to the pipe between the first station 612 and the second station 614. The fixed reference nodes 108 (such as the routers 624) can be wired or wireless devices.

The routers 624 form a mesh network 102 (either wired or wireless) that will transport information from sensors on the mobile tags 106 as the temperature and pressure gauges 616 back to the monitoring device 622 at the first station 612. Additionally, a router 624 at the top of a manhole can alert a customer of an approaching liner fold.

Furthermore, additional routers or sensors can be imbedded in the liner netting (e.g., every 5, 10, 15, 20, 25, 30, 35, 40, 45, 50, etc. feet) to allow for increased accuracy in tracking of the location of the mobile tag 106 associated with the liner nose 620. As the mobile tag 106 attached to or near the liner nose 620 passes the routers, its location is reported back to the monitoring device 622 via the mesh network 102 formed by the aforementioned routers 624. The routers can also contain sensors, for example, to monitor conditions such as temperature and pressure at the location of the router. Examples of other sensors that the routers could contain include strain gauges and gas monitoring sensors.

In one exemplary embodiment, the system 100 includes a user interface which runs on the monitoring device 622 and facilitates the reception, processing, and storage of the information from the mobile tags 106. A user can interact with the user interface to generate reports and/or graphical displays based on the information. In one exemplary embodiment, the user interface is a Web-browser interface running on the monitoring device.

The user interface supports functionality including, for example, providing a graphical representation/view of the monitored area or sewer line. This graphical view will include an overlay image of the pipeline. The display will identify the location of each router (e.g., reference node 108) and the location of the liner nose. The location of the liner nose 620 will be updated as it passes through the host pipe 604 during the inversion process. The assets will be "clickable" so a customer can get details, such as sensor readings (e.g., from sensors 616), on any asset on the screen without leaving the page. The customer may also elect to record the date and time of the view to look back in history and see where assets were at various points in time, and scroll through history to watch the movements as previously recorded or in real time.

The user interface supports functionality including, for example, providing alerts. For each sensor, there can be various events or thresholds used to trigger an alert. The alert notification can be of varying types (e.g., displaying a message on a screen, sending an email, initiating a phone message).

The user interface supports functionality including, for example, generating reports. A number of reports will be developed and accessible to the customer. Aspects of the reports may be customizable by the customer. Reports could include, for example, a history of sensor readings (e.g., reported every 3 minutes) by project; an alert log that will display all alerts that have been triggered over any period of time; and an audit log that displays activity by user within the system including times logged in, changes performed, etc.

One of ordinary skill in the art will appreciate that in addition to the examples set forth herein, the general inventive concepts could be applied to numerous applications spanning various fields and technologies.

In view of the above, operation of the real-time location system 100 will now be described in further detail. Initially, each object or asset to be monitored/tracked is fitted with a mobile tag 106. In one exemplary embodiment, the mobile tag 106 includes the module 200. The mobile tag 106 can be attached to the object in any manner sufficient to secure the mobile tag 106 to the object, whether temporarily, semi-permanently or permanently. For example, if the object is a car, the mobile tag 106 could be attached (e.g., glued, magnetically coupled) under a fender or bumper of the car. As another example, the mobile tag 106 could be adhered to or hung from a rear view mirror of the car. In the case of cattle, the mobile tag 106 could be added to an existing passive RFID DNA tag, which is typically inserted in a cow's ear like an earring. In the case of a shopping cart, the tag could be attached to the handle. In the case of the liner for the CIPP process, the tag could be attached to the liner in a pouch formed therein or by adhesive. Once attached, the mobile tag 106 and the corresponding object form the mobile node 104 that can be monitored/tracked by the real-time location system 100.

In one exemplary embodiment, the mobile tags 106 are normally in "sleep" mode (i.e., the default mode is sleep mode), in order to conserve a battery powering the mobile tag 106. The mobile tags 106 are then provisioned to wake up periodically on a timed interval. Alternatively or additionally, the mobile tags 106 can be "polled," for example by the software 110, to get sensor information and/or the current location of the tagged object. Alternatively or additionally, the mobile tags 106 can be provisioned to "wake up" in response to one or more predefined events. For example, a mobile tag 106 can be provisioned to "wake up" and report its location if the accelerometer or motion detector sensor on the mobile tag 106 recognizes that the tagged object is moving. These provisioned modes can be programmed to activate only during certain hours, for example, after a car dealership closes for the night.

Once the mobile tag 106 of a mobile node 104 wakes up, it will transmit a beacon signal out to the mesh network 102. The aforementioned provisioning modes can control the frequency that the mobile node 104 sends out its beacon signal. Depending on the strength of its radio, the signal is able to travel between 250 meters and 1 mile, or further. All reference nodes 108 that receive the signal respond back to the mobile node 104 with their x,y coordinates and RSSI (received signal strength indicator) value. The mobile node 104 can then use these values (from 2 or more reference nodes 108) to internally calculate its current location relative to the defined environment. Because the location determination is done locally on the nodes, as opposed to using a centralized software-based calculation approach, less network traffic bandwidth is utilized.

In one exemplary embodiment, as noted above, a differential approach to determining location information for the mobile nodes 104 within the mesh network 102 is used. According to this differential approach, each references node 108 is calibrated and tested to determine its actual x,y location. Then, periodically (e.g., during installation and setup of the reference node 108), the reference node 108 will internally calculate its x,y location. The calculated x,y coordinates are compared with the actual x,y coordinates to obtain a differential offset value. This differential offset value can in turn be used to adjust or fine-tune the location calculations of the mobile tags 106 in the area.

Once the mobile node 104 calculates its current position, it sends this position in the form of a packet to the nearest reference node 108 (determined based on the received RSSI values), which in turn forwards the packet through the mesh network 102 back to the gateway 118. In accordance with the general inventive concepts, communication by and between the nodes 104 and 108 can be wired or wireless, as can communication within the mesh network 102 and outside the mesh network 102 (e.g., via gateway 118). The gateway 118 then processes the packet and presents it to the user in a number of different ways. In one exemplary embodiment, a map of the defined environment (or a relevant portion thereof) is presented (e.g., displayed on a display of the client computer 112) with the mobile node 104 appearing as an icon and positioned in the location on the map based on the calculated location of the mobile node 104. The packet can also trigger an alert or alarm, based on user-defined guidelines set in the software 110. For example, if the mobile node 104 triggers the alert after business hours, the software 110 could make a phone call to authorities and/or send an e-mail or page to any designated personnel.

In another exemplary embodiment, the software 110 includes a feature that allows a user to specify certain areas or zones (also called "geozones") within the defined environment using the GUI. If a mobile node 104 enters or leaves a specified zone, the real-time location system 100 can trigger an event, for example, a notification to a car dealership employee that a car being test driven by a prospective customer has returned to the lot.

Multiple geozones can be imbedded in a mobile tag 106 to facilitate determination of whether the mobile tag 106, which calculates its own location, is moving into or out of one of the geozones. In one exemplary embodiment, each geozone is represented as a table of x,y coordinates representing a ring or perimeter around a particular location. By using imbedded geozones, less location traffic needs to be sent through the mesh network 102, thereby reducing power consumption.

In view of the above, the real-time location system 100 provides a robust, flexible and highly-scalable system for remotely, accurately, efficiently, and/or readily tracking and securing objects (e.g., equipment, inventory, people) at a relatively low cost. The real-time location system 100 can reduce equipment theft, damage and downtime. The real-time location system 100 can enable more accurate and quicker object location thereby, for example, facilitating on-demand inventory management that reduces audit costs and improves customer service.

The above description of specific embodiments has been given by way of example. From the disclosure given, those skilled in the art will not only understand the general inventive concepts and their attendant advantages, but will also find apparent various changes and modifications to the systems and methods disclosed. It is sought, therefore, to cover all such changes and modifications as fall within the spirit and scope of the general inventive concepts, as described and claimed herein, and any equivalents thereof.

The invention claimed is:

1. A method for installing a liner including a resin in a pipe situated below ground, the method comprising:
affixing a plurality of mobile tags along a length of the liner;
positioning the liner within the pipe;

applying energy to the liner to cure the resin such that the liner is bonded to the pipe;

using a sensing network situated above ground to obtain localized temperature measurements from each of the mobile tags within the pipe at approximately the same time during application of the energy to the liner; and using the localized temperature measurements to control application of the energy along the length of the liner.

2. The method of claim 1, wherein the mobile tags are positioned every 10 to 20 feet along the length of the liner.

3. The method of claim 1, wherein the mobile tags are equidistantly spaced along the length of the liner.

4. The method of claim 1, wherein applying the energy includes exposing the resin to UV light.

5. The method of claim 1, wherein the energy is thermal energy.

6. The method of claim 5, wherein the thermal energy is from at least one of heated water and steam.

7. The method of claim 1, further comprising:

using the sensing network situated above ground to obtain localized pressure measurements from each of the mobile tags within the pipe at approximately the same time during application of the energy to the liner; and using the localized pressure measurements to control application of the energy along the length of the liner.

8. The method of claim 1, further comprising:

affixing a nose mobile tag at a leading end of the liner; and using the nose mobile tag to detect when the leading end of the liner reaches a predetermined position within the pipe during the positioning of the liner within the pipe.

9. The method of claim 1, wherein the method further comprises:

forming the sensing network by positioning a plurality of reference tags above ground to define a tracking area, the tracking area extending at least between a first location and a second location, the liner positioned in the pipe between the first location and the second location, wherein each of the mobile tags communicates with one or more of the reference tags so that the sensing network obtains the localized measurements at approximately the same time.

10. The method of claim 1, wherein the mobile tags are aligned with one another along the length of the liner.

11. The method of claim 1, wherein the mobile tags are distributed around a circumference of the liner along the length of the liner.

12. The method of claim 1, wherein the sensing network is a wireless network.

13. The method of claim 1, wherein each of the mobile tags enters a sleep state when not transmitting its localized measurement.

* * * * *